May 19, 1953    C. G. EVANS ET AL    2,639,258
PRODUCTION OF ARTICLES FROM SYNTHETIC RESINOUS MATERIALS
Filed Dec. 29, 1950    2 Sheets-Sheet 1

*Fig. 1.*

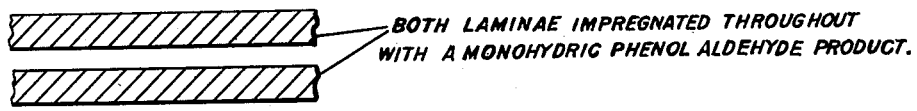

BOTH LAMINAE IMPREGNATED THROUGHOUT WITH A MONOHYDRIC PHENOL ALDEHYDE PRODUCT.

*Fig. 2.*

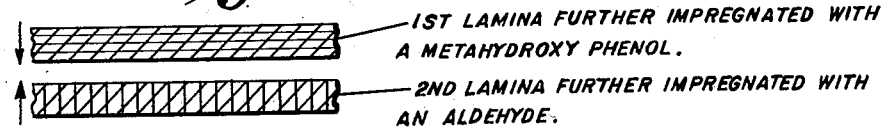

1ST LAMINA FURTHER IMPREGNATED WITH A METAHYDROXY PHENOL.

2ND LAMINA FURTHER IMPREGNATED WITH AN ALDEHYDE.

*Fig. 3.*

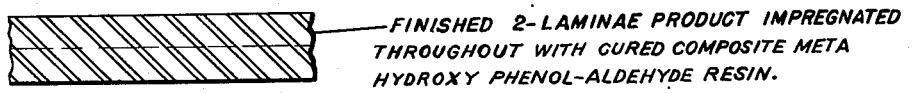

FINISHED 2-LAMINAE PRODUCT IMPREGNATED THROUGHOUT WITH CURED COMPOSITE META HYDROXY PHENOL-ALDEHYDE RESIN.

*Fig. 4.*

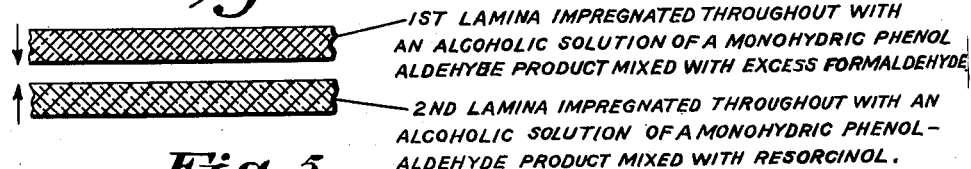

1ST LAMINA IMPREGNATED THROUGHOUT WITH AN ALCOHOLIC SOLUTION OF A MONOHYDRIC PHENOL ALDEHYDE PRODUCT MIXED WITH EXCESS FORMALDEHYDE

2ND LAMINA IMPREGNATED THROUGHOUT WITH AN ALCOHOLIC SOLUTION OF A MONOHYDRIC PHENOL-ALDEHYDE PRODUCT MIXED WITH RESORCINOL.

*Fig. 5.*

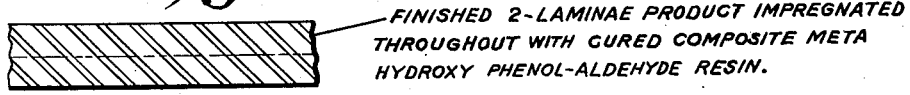

FINISHED 2-LAMINAE PRODUCT IMPREGNATED THROUGHOUT WITH CURED COMPOSITE META HYDROXY PHENOL-ALDEHYDE RESIN.

*Fig. 6.*

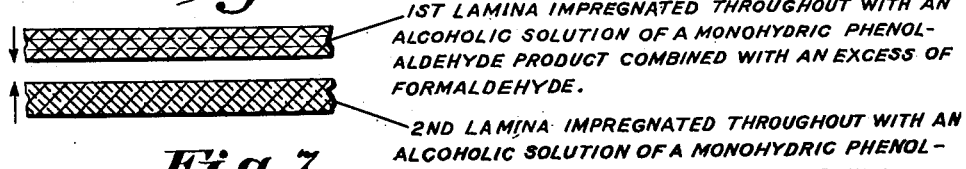

1ST LAMINA IMPREGNATED THROUGHOUT WITH AN ALCOHOLIC SOLUTION OF A MONOHYDRIC PHENOL-ALDEHYDE PRODUCT COMBINED WITH AN EXCESS OF FORMALDEHYDE.

2ND LAMINA IMPREGNATED THROUGHOUT WITH AN ALCOHOLIC SOLUTION OF A MONOHYDRIC PHENOL-ALDEHYDE PRODUCT MIXED WITH RESORCINOL.

*Fig. 7.*

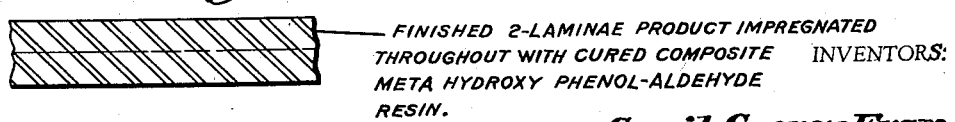

FINISHED 2-LAMINAE PRODUCT IMPREGNATED THROUGHOUT WITH CURED COMPOSITE META HYDROXY PHENOL-ALDEHYDE RESIN.

INVENTORS:
Cyril George Evans,
& Arthur Baker,
BY
ATTORNEYS.

May 19, 1953     C. G. EVANS ET AL     2,639,258

PRODUCTION OF ARTICLES FROM SYNTHETIC RESINOUS MATERIALS

Filed Dec. 29, 1950     2 Sheets-Sheet 2

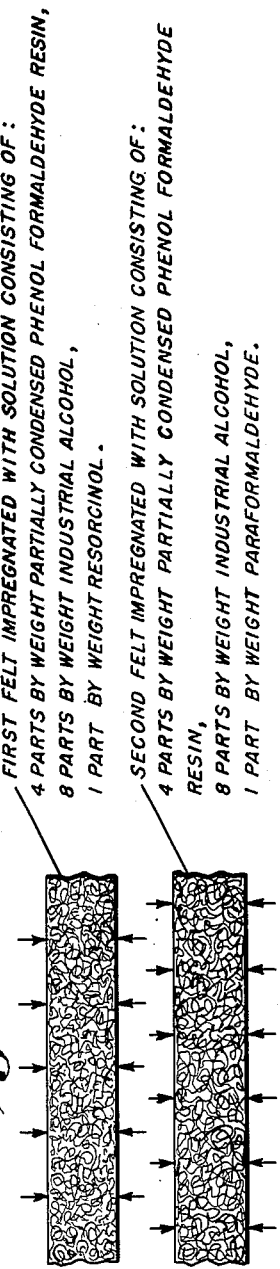

Fig. 8.

FIRST FELT IMPREGNATED WITH SOLUTION CONSISTING OF:
4 PARTS BY WEIGHT PARTIALLY CONDENSED PHENOL FORMALDEHYDE RESIN,
8 PARTS BY WEIGHT INDUSTRIAL ALCOHOL,
1 PART BY WEIGHT RESORCINOL.

SECOND FELT IMPREGNATED WITH SOLUTION CONSISTING OF:
4 PARTS BY WEIGHT PARTIALLY CONDENSED PHENOL FORMALDEHYDE RESIN,
8 PARTS BY WEIGHT INDUSTRIAL ALCOHOL,
1 PART BY WEIGHT PARAFORMALDEHYDE.

Fig. 9.

THE IMPREGNATED FELTS, AFTER BEING SUBJECTED INDIVIDUALLY, TO CALENDERING TO CONSOLIDATE THEIR FIBROUS STRUCTURE.

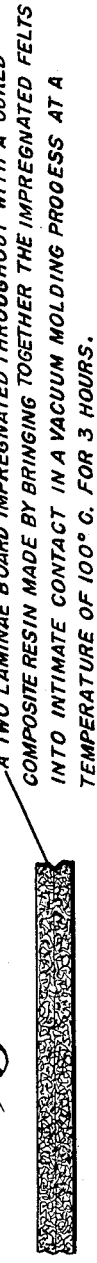

Fig. 10.

A TWO LAMINAE BOARD IMPREGNATED THROUGHOUT WITH A CURED COMPOSITE RESIN MADE BY BRINGING TOGETHER THE IMPREGNATED FELTS INTO INTIMATE CONTACT IN A VACUUM MOLDING PROCESS AT A TEMPERATURE OF 100° C. FOR 3 HOURS.

INVENTORS:
*Cyril George Evans,*
*Arthur Baker,*

BY

ATTORNEYS.

Patented May 19, 1953

2,639,258

UNITED STATES PATENT OFFICE 2,639,258

PRODUCTION OF ARTICLES FROM SYNTHETIC RESINOUS MATERIALS

Cyril George Evans, Sandhurst, and Arthur Baker, Farnborough, England, assignors to Minister of Supply in His Majesty's Government of the United Kingdom of Great Britain and Northern Ireland, London, England Application December 29, 1950, Serial No. 203,568
In Great Britain April 2, 1948

10 Claims. (Cl. 154—140)

This invention relates to the manufacture of reinforced synthetic resinous products, and has for an object to provide novel methods for the manufacture of such products in which either the temperature or the time, or both, necessary for the curing operation is much reduced as compared with methods using commonly employed materials such as phenolformaldehyde and other phenolic resins made from monohydric phenols, especially in the manufacture of large structures such as the wings of aircraft.

This application is a continuation-in-part application of application Serial No. 84,768, filed March 31, 1949, now abandoned.

In theory it is possible to reduce the temperature and time, or both, by using a meta-hydroxy phenol such as resorcinol, which is more reactive than the commonly used phenolic resins or by using strong catalysts. In practice, however, the shelf life of a felt or other reinforcement impregnated with such a meta-hydroxy phenol is inconveniently shorter than that of a reinforcement impregnated with a commonly used phenolic resin, and meta-hydroxy phenol, and strong catalysts, have hitherto been considered unsuitable in cases where the expenditure of considerable time is unavoidable, e. g. in the case of large or complex mouldings where assembly operations necessarily take a long time.

It is a further object of the present invention to provide a method of manufacturing built up reinforced synthetic resinous products using the more active phenolic resins made from meta-hydroxy phenols, using a known resin forming reaction and in which the impregnated reinforcements employed have a useful shelf life because said reaction can be prevented or at least minimised for some time.

According to the invention a meta-hydroxy phenol and an aldehyde are used as the essential constituents of a resin forming reaction, are kept apart by separately impregnating them into separate felt or other reinforcements, respectively (for example, into initially separate reinforcement laminae of a laminated reinforced product), such separately impregnated reinforcements being kept separate until the resin forming reaction is required to take place when they are brought into intimate contact with one another.

It may be desirable to carry out the impregnation rapidly and for this purpose the meta-hydroxy phenol and the aldehyde used may be incorporated in separated alcoholic solutions, respectively, which are preferably of low viscosity in the range 3–7 centistokes at a temperature of 25° C. so that they easily penetrate the reinforcements, the alcohol being permitted to evaporate afterwards.

It is also desirable, especially when the reinforcements are thick to impregnate some or all of them with a partially condensed resinous liquid formed by a reaction between a monohydric phenol and an aldehyde. This resinous liquid acts not only to assist the impregnation of separate reinforcements with the meta-hydroxy phenol and the aldehyde, respectively, but also acts as a carrier or vehicle for the meta-hydroxy phenol and the aldehyde and so assists the complete mixing together of these two constituents when the separately impregnated reinforcements are brought into intimate contact with one another.

The reinforcements may be first impregnated with the monohydric phenol aldehyde carrier and subsequently further impregnated with the meta-hydroxyphenol or the aldehyde. Alternatively, the carrier may be incorporated in a metahydroxy-phenol-carrier mixture and a separate aldehyde-carrier mixture or, for example, in an alcoholic solution of either mixture, one of the mixtures being used for the impregnation of any one reinforcement, as will be hereinafter described.

The meta-hydroxy phenol when dispersed in a fibrous or other reinforcement in this novel way not only has a useful shelf life but also when it comes into contact with the aldehyde when two separately impregnated reinforcements are brought into intimate contact, has the effect of accelerating the condensation of any more slowly reacting resinous constituents which are present.

In all cases the proportion of aldehyde used determines whether the resin in the final product is thermoplastic or thermosetting.

Figure 1 shows in fragmentary section two felt fibrous reinforcements impregnated with a monohydric phenol aldehyde resin as a carrier or vehicle;

Figure 2 shows the same felts further impregnated, the one with a metahydroxy phenol and the other with an aldehyde;

Figure 3 shows the finished product prepared by pressing the two felts together and curing; and, Figure 4 shows in fragmentary section another two felts impregnated, in this case, the first with an alcoholic solution of a monohydric phenol aldehyde product mixed with excess formaldehyde and the second with an alcoholic solution of a monohydric phenol aldehyde product mixed with resorcinol;

Figure 5 shows the finished product obtained by pressing together the felts of Figure 4 and curing; while, Figure 6 shows, also in fragmentary section, two other felts impregnated the one with an alcoholic solution of a monohydric phenol aldehyde product combined with an excess of formaldehyde and the other with an alcoholic solution of a monohydric phenol aldehyde product mixed with resorcinol; and Figure 7 shows the finished product obtained by pressing together the felts of Figure 6 and curing;

Figure 8 shows in fragmentary section two felts impregnated the one with a solution consisting of:

4 parts by weight partially condensed phenol formaldehyde resin
8 parts by weight industrial alcohol, and
1 part by weight resorcinol and the other with a solution consisting of:

4 parts by weight partially condensed phenol formaldehyde resin
8 parts by weight industrial alcohol, and
1 part by weight paraformaldehyde;

Figure 9 shows the felts of Figure 8 after calendering but still separate; and

Figure 10 shows the same felts after pressing together and curing.

In further describing the invention it is to be understood that the meta-hydroxy phenol used contains at least the structure:

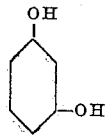

This is the formula of resorcinol but additional OH groups may be present as in phloroglucinol:

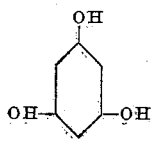

and pyrogallol:

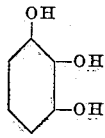

The third OH may or may not be meta to the —OH groups of the resorcinol structure, it being essential only that at least two —OH groups should be in the meta position relative to each other. Other suitable substituents such as CH$_3$, C$_2$H$_5$ may also be present.

The carrier resin may be defined as a partially condensed liquid condensation product made from a phenol whose molecule contains only one —OH group per benzene ring, e. g. phenol itself:

Other suitable substituents may be present as in m-cresol:

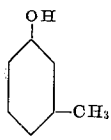

The carrier resin contains a mixture of molecules in which each benzene ring contains one —OH group directly attached to the benzene ring. Each benzene ring also contains one or more —CH$_2$OH groups. The mixture of molecules includes compounds of the types:

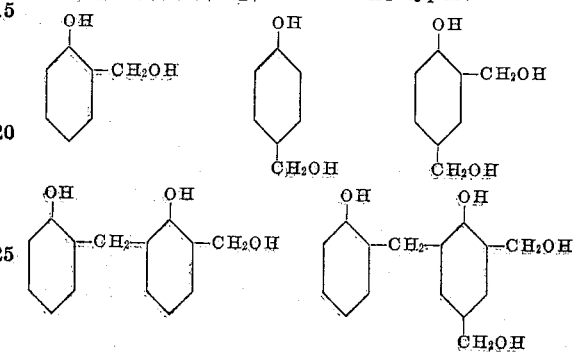

etc.

As indicated below a sufficiently large proportion of aldehyde must be used if the resin of the final product is to be thermosetting. For example, in the case of resorcinol and formaldehyde, the latter must be at least in equimolecular ratio with the former in order to ensure that the final resin is thermosetting.

A simple example of the invention as applied to the manufacture of two ply reinforced synthetic resinous board will now be described.

In this example two asbestos felts each initially 1 cm. thick are impregnated with the following solutions, respectively; the first felt with a mixture of resorcinol 1 part by weight, water 5 parts by weight and sodium hydroxide 0.02 part by weight, and the second felt with formalin.

The first felt is dried in warm air at a temperature of 50° C., allowed to cool and is then stored in air of 65% relative humidity. The second felt without drying is stored, separately, from the first felt, in a similar atmosphere. Finally, the felts are laid up in close contact, and vacuum moulded for about 3 hours at a temperature of 100° C. whereby the formation and curing of the meta-hydroxy phenol aldehyde resin is effected. Prior to laying up in close contact the impregnated felts were subjected individually to a cold pressing operation at a pressure of 560 lb./sq. in. for 10 seconds.

It has been found satisfactory to prepare the resorcinol solution for the first felt as an alcohol instead of a water solution and to dry the impregnated first felt at room temperature, and also to mix the sodium hydroxide with the formalin instead of with the resorcinol.

When a reinforcement is to be impregnated with a monohydric resin as set forth above it is preferable to prepare the meta-hydroxy phenol or the aldehyde constituent with which it is also to be impregnated as one of the following alcohol solutions:

(a) a monohydric phenol, such as phenolic resin, mixed with the excess aldehyde.
(b) a monohydric phenol, such as phenolic resin, combined with excess aldehyde.

(c) a monohydric phenol, such as phenolic resin, mixed with a meta-hydroxy phenol.

(d) a meta-hydroxy phenol (e. g. resorcinol) aldehyde (e. g. formaldehyde) resin.

Ordinary commercial grade phenolic resins which are condensation products of phenol and formaldehyde with pH values of approximately 8.5, and are "water soluble" in the sense that they are miscible to a limited degree with water may be used, such phenolic resins being miscible in all proportions with industrial methylated spirit. For the resin forming reaction a felt soaked in either alcohol solution (a) or (b) is brought into intimate contact with a felt soaked in alcohol solution (c) or (d).

As the viscosity of resin solutions with which reinforcements are separately impregnated determines in part the resin content of the final product it is advantageous to maintain their kinematic viscosities before impregnation within the range 3 to 7 centistokes at a temperature of 25° C.

For convenience and simplicity in hereafter describing more specifically the use of such alcoholic solutions in the method according to the invention, reference will be made only to the use of asbestos felts as reinforcements in the manufacture of two ply boards, it being understood that other reinforcing materials can be readily substituted as required and hereinafter described.

In general, asbestos felt reinforcements are impregnated by soaking for approximately 2 minutes in the alcoholic solutions, some 50 gms. weight of solution being required for each 100 sq. cms. area of 1 cm. thick felt.

For convenience of manufacture only two solutions will usually be employed, one selected from group (a) or (b) and the other from group (c) or (d).

After impregnation with the alcohol solutions the felts are conditioned first by subjecting them to suction to remove excess solution, secondly by allowing alcohol to evaporate at room temperature and lastly by humidifying them in air of 65% relative humidity for at least 24 hours. By this humidification the flexibility of the felts is maintained and resin flow during subsequent pressing and moulding operations is improved. The humidification of differently impregnated felts is carried out in separate vessels so that contamination of aldehyde-containing felts with vapour emanating from meta-hydroxy phenol containing felts, or vice versa, cannot occur. After this conditioning the felts are ready for storage.

Some specific examples of the application of the invention using alcoholic solutions to the manufacture of two ply reinforced synthetic resinous boards will now be given:

*Example 1*

In this example, two asbestos felt reinforcements each initially 1 cm. thick are impregnated, the one with a solution prepared by mixing:

4 parts by weight of partially condensed phenol-formaldehyde resin, 8 parts by weight industrial alcohol, and 1 part by weight resorcinol, and the other felt is impregnated with a solution prepared by mixing:

4 parts by weight partially condensed phenol-formaldehyde resin, 8 parts by weight industrial alcohol and 1 part by weight paraformaldehyde.

The partially condensed phenol-formaldehyde resin of both solutions is any convenient one of the many commercially obtainable liquid condensation products of a monohydric phenol and formaldehyde. Such products are usually made by heating aqueous solutions of phenol and formaldehyde in the molar relation 1:1.5 to 2.5, sodium hydroxide in the proportion of not more than 1 mole per 20 moles of phenol being employed as catalyst. The resin solutions, which may contain up to 50% by weight of water, have pH values of approximately 8.5 and a limited degree of miscibility with water and are miscible in all proportions with industrial methylated spirit. Because of the exothermic nature of the reaction by which these phenol-formaldehyde resins are usually produced, the conditions of time and temperature cannot be exactly specified but may vary in ways well known in the art according to the size of the batch and the amount of catalyst. When the reaction has proceeded to a sufficient extent, as indicated by viscosity or other physical properties (e. g. refractive index, density, vapour pressure) the excess of formaldehyde (i. e. any unreacted formaldehyde) is removed and the solution partially dehydrated by boiling under reduced pressure. The major organic part of the resin so produced is a mixture of substances known as hydroxymethyl phenols.

Finally, the impregnated felts are brought together and vacuum moulded at a temperature of 100° C. for about 3 hours.

*Example 2*

The first felt is impregnated with a solution prepared by mixing 1 part by weight of paraformaldehyde with 4 parts of phenol-formaldehyde resin at a temperature of 20° C. and 10 parts by weight of alcohol. The second felt is impregnated with a solution prepared by dissolving 1 part by weight of resorcinol in 10 parts by weight of alcohol by warming, cooling this and then mixing it with 4 parts by weight of phenol-formaldehyde resin. The two felts are placed in contact with one another and vacuum moulded to form the finished board as in Example 1.

*Example 3*

The first felt is impregnated with a solution consisting of 1 part by weight of paraformaldehyde, 4 parts by weight of phenol-formaldehyde resin and 12 parts by weight of alcohol. The second felt is impregnated with a solution of 1 part by weight of resorcinol dissolved in 12 parts by weight of alcohol mixed with 4 parts by weight of phenolic resin. The impregnated felts are placed together and vacuum moulded as in Example 1.

*Example 4*

The first felt is impregnated with a solution consisting of 8 parts by weight of phenolic resin and 9 parts by weight of alcohol with 4 parts by weight of formalin added. The second felt is impregnated with 1 part by weight of resorcinol dissolved in 6 parts by weight of alcohol mixed with 4 parts by weight of phenolic resin. The impregnated felts are placed together and vacuum moulded as in Example 1.

Resorcinal and paraformaldehyde, each mixed with a typical phenolic resin as above set forth in the ratio of 1 to 4 parts by weight, and in the form of alcoholic solutions if required, have been found to be particularly suitable for use as the separate meta-hydroxy phenol and aldehyde reaction constituents, respectively, in the method according to the invention. These mixtures are found to remain stable for at least 16 days at temperatures of the order of 20° C., and separately stored reinforcements impregnated with alcoholic solutions of said mixtures have the same order of stability after the alcohol has evaporated. The final product obtained by vacuum moulding reinforcements impregnated by the resorcinol and paraformaldehyde mixtures just set forth contain resin which is substantially equivalent to the resin which is obtainable by mixing 1 part by weight of resorcinol, 1 part by weight of formaldehyde and 8 parts by weight of the typical phenolic resin, but such a mixture, per se, is stable for only some 24 hours at a temperature of the order of 20° C. and at a temperature 100° C. from a gel in 30 minutes and becomes completely cured in only 3 hours.

Where felt or like reinforcements are used in the method of the invention these may at any convenient time after separate impregnation and before being brought into intimate contact for the resin forming reaction be cold pressed or calendered so that the fibres are caused to be more nearly parallel to the general planes of the felts. For this purpose pressures of the order of 560 lbs. per square inch maintained for about 10 seconds have been found satisfactory.

Although in the examples given the relatively more reactive phenol is resorcinol, it will be apparent to those skilled in the art that other substances such as phloroglucinol or pyrogallol comprised in the group of substances known generally as meta-hydroxy phenols may be used instead of resorcinol. It will also be apparent that substances such as crotonaldehyde or furfural comprised in the group of substances known generally as aldehydes can be substituted for the formaldehyde specifically mentioned and that substances such as the cresylic resins or urea formaldehyde condensation products can be substituted for the carrier resin specifically mentioned above.

It will be understood the invention is useful for the manufacture of other products than two ply or multilayer boards or moulded articles, for example the reinforcements employed may be in the form of strands or cords which after separate impregnation, and such separate storage as may be desired according to convenience, are brought into intimate contact for the resin forming reaction by twisting or weaving them together.

It will be apparent to those skilled in the art that complete mixing of the meta-hydroxy phenol and aldehyde resin forming reaction constituents throughout separately impregnated reinforcements, such as paper sheets or fine threads, which are of small thickness will readily take place without the previous impregnation of the reinforcements with a carrier resin or even the use of constituents in the form of alcoholic solutions, and that the need to use carrier resins and alcoholic solutions will depend upon the thickness of the reinforcements in any particular case. In some cases, depending upon the thickness of the reinforcements employed, it will be possible for complete mixing of the meta-hydroxy phenol and aldehyde resin forming reaction constituents to take place at ordinary room temperature.

In the improved method according to the invention, without the use of unduly strong acid or alkaline catalysts, the curing temperature can be at least 30° C. lower or the curing time can be so much as 70% less than in conventional methods using ordinary phenolic resins made from the monohydric phenols, and, moreover, the mechanical properties of products manufactured in accordance with the invention are at least as good as those of the reinforced synthetic resinous products produced by the conventional methods.

What we claim is:

1. A method of manufacturing reinforced synthetic resinous products in which at least two reinforcements are employed and a meta-hydroxy phenol and an aldehyde are used as constituents of a resin forming condensation reaction, which comprises the steps of impregnating said reinforcements throughout with a liquid condensation product of a reaction between a monohydric phenol and an aldehyde, impregnating at least one reinforcement throughout with the meta-hydroxy phenol, separately impregnating at least one other reinforcement throughout with the aldehyde, subsequently bringing at least one meta-hydroxy phenol impregnated reinforcement into intimate contact with at least one aldehyde impregnated reinforcement whereby the meta-hydroxy phenol and the aldehyde become mixed and react in the presence of the monohydric phenol to form a cured composite resin throughout the reinforcements.

2. A method as claimed in claim 1 in which the meta-hydroxy phenol is selected from the group consisting of resorcinol, phloroglucinol and pyrogallol and in which the aldehyde is selected from the group consisting of formaldehyde, paraformaldehyde, crotonaldehyde and furfural.

3. A method as claimed in claim 1, in which the liquid condensation product is formed by heating mixed aqueous solutions of phenol and formaldehyde in the molar relation 1:1.5 to 2.5 with sodium hydroxide as catalyst in the proportion of not more than 1 mole per 20 moles of phenol.

4. A method as claimed in claim 1, including the step of exposing the separately impregnated reinforcements to air of substantially 65% relative humidity at room temperature for at least 24 hours before they are brought into intimate contact.

5. A method as claimed in claim 1, including the step of cold pressing the separately impregnated reinforcements at an approximate pressure of 560 lb./sq. in. for approximately 10 seconds before they are brought into intimate contact.

6. A method of manufacturing reinforced synthetic resinous products in which at least two reinforcements are employed and a meta-hydroxy phenol and an aldehyde are used as constituents of a resin forming condensation reaction, which comprises the steps of impregnating at least one reinforcement throughout with a reaction constituent in the form of an alcoholic solution of a liquid condensation product of a reaction between a monohydric phenol and an aldehyde mixed with an excess of formaldehyde, separately impregnating at least one other reinforcement throughout with a reaction constituent in the form of an alcoholic solution of the said liquid condensation product mixed with resorcinol, subsequently bringing at least two such separately impregnated reinforcements into intimate contact, whereby the resorcinol and the aldehyde become mixed together, and react in the presence of the monohydric phenol to form a cured composite resin throughout the reinforcements.

7. A method of manufacturing reinforced synthetic resinous products in which at least two reinforcements are employed and a meta-hydroxy phenol and an aldehyde are used as constituents of a resin forming condensation reaction, which comprises the steps of impregnating at least one reinforcement throughout with a reaction constituent in the form of an alcoholic solution of a liquid condensation product of a reaction between a monohydric phenol and an aldehyde combined with an excess of formaldehyde, separately impregnating at least one other reinforcement throughout with a reaction constituent in the form of an alcoholic solution of the said liquid condensation product mixed with resorcinol, subsequently bringing at least two such separately impregnated reinforcements into intimate contact whereby the resorcinol and the aldehyde become mixed together and react in the presence of the monohydric phenol to form a cured composite resin throughout the reinforcements.

8. A method of manufacturing reinforced synthetic resinous products in which at least two reinforcements are employed and a meta-hydroxy phenol and an aldehyde are used as constituents of a resin forming condensation reaction, which comprises the steps of impregnating at least one reinforcement throughout with a reaction constituent in the form of an alcoholic solution of a liquid condensation product of a reaction between a monohydric phenol and an aldehyde mixed with an excess of formaldehyde, separately impregnating at least one other reinforcement throughout with a reaction constituent in the form of an alcoholic solution of the said liquid condensation product mixed with an alcoholic solution of a resorcinol-formaldehyde resin, subsequently bringing at least two such separately impregnated reinforcements into intimate contact whereby the resorcinol formaldehyde resin and the aldehyde become mixed together and react in the presence of the monohydric phenol to form a cured composite resin throughout the reinforcements.

9. A method of manufacturing reinforced synthetic resinous products in which at least two reinforcements are employed and a meta-hydroxy phenol and an aldehyde are used as constituents of a resin forming condensation reaction, which comprises the steps of impregnating at least one reinforcement throughout with a reaction constituent in the form of an alcoholic solution of a liquid condensation product of a reaction between a monohydric phenol and an aldehyde, combined with an excess of formaldehyde, separately impregnating at least one other reinforcement throughout with a reaction constituent in the form of an alcoholic solution of the said liquid condensation product mixed with an alcoholic solution of a resorcinol-formaldehyde resin, subsequently bringing at least two such separately impregnated reinforcements into intimate contact whereby the resorcinol formaldehyde resin and the aldehyde become mixed together and react in the presence of the monohydric phenol to form a cured composite resin throughout the reinforcements.

10. A method of manufacturing reinforced synthetic resinous products in which at least two reinforcements are employed and a meta-hydroxy phenol and an aldehyde are used as constituents of a resin forming condensation reaction, and which, comprises the steps of impregnating at least one reinforcement throughout with a reaction constituent in the form of an alcoholic solution of a mixture of one part by weight of resorcinol and four parts by weight of a liquid condensation product of a reaction between a monohydric phenol and an aldehyde, impregnating at least one other reinforcement throughout with a reaction constituent in the form of an alcoholic solution of a mixture of one part by weight of paraformaldehyde and four parts by weight of said condensation product, subsequently bringing at least two such separately impregnated reinforcements into intimate contact whereby the resorcinol and the aldehyde become mixed together, and react in the presence of the monohydric phenol to form a cured composite resin throughout the reinforcements; each of the two alcoholic solutions having a viscosity within the range three to seven centistokes at a temperature of twenty five degrees centigrade.

CYRIL GEORGE EVANS.
ARTHUR BAKER.

References Cited in the file of this patent

UNITED STATES PATENTS

| Number | Name | Date |
| --- | --- | --- |
| 2,414,414 | Rhodes | Jan. 14, 1947 |
| 2,414,415 | Rhodes | Jan. 14, 1947 |
| 2,443,197 | Rhodes | June 15, 1948 |
| 2,495,175 | Nagel | Jan. 17, 1950 |
| 2,557,826 | Keaton et al. | June 19, 1951 |

FOREIGN PATENTS

| Number | Country | Date |
| --- | --- | --- |
| 658,269 | Great Britain | Oct. 3, 1951 |